United States Patent
Dirschedl et al.

(10) Patent No.: US 6,922,401 B1
(45) Date of Patent: Jul. 26, 2005

(54) ARRANGEMENT FOR OPTIMIZING THE DATA TRANSMISSION OVER A BIDIRECTIONAL RADIO CHANNEL

(75) Inventors: Werner Dirschedl, Munich (DE); Rainer Riek, Neufarn (DE); Guenter Greiner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 09/622,982
(22) PCT Filed: Feb. 25, 1999
(86) PCT No.: PCT/EP99/01220
§ 371 (c)(1),
(2), (4) Date: Oct. 19, 2000
(87) PCT Pub. No.: WO99/44325
PCT Pub. Date: Sep. 2, 1999

(30) Foreign Application Priority Data

Feb. 25, 1998 (DE) .......................... 198 07 931

(51) Int. Cl.⁷ ............................................. H04B 7/005
(52) U.S. Cl. ......................... 370/278; 370/470; 714/779
(58) Field of Search ................................ 370/254–258, 370/278, 296, 310.1, 310.2, 465, 466, 468, 470, 471, 473, 477, 545, 310; 375/294, 316, 224, 395; 395/200; 709/103, 104, 105, 236; 714/18, 19, 33, 779, 821; 455/39, 73, 500, 502, 466, 343; 371/5.5, 32

(56) References Cited

U.S. PATENT DOCUMENTS

| 4,914,653 A | * | 4/1990 | Bishop et al. .............. 370/462 |
|---|---|---|---|
| 5,027,348 A | | 6/1991 | Curry, Jr. |
| 5,251,209 A | | 10/1993 | Jurkevich et al. |
| 5,513,213 A | | 4/1996 | Patel et al. |
| 5,737,706 A | * | 4/1998 | Seazholtz et al. ........... 455/466 |
| 5,809,415 A | * | 9/1998 | Rossmann ............... 455/422.1 |
| 6,064,678 A | * | 5/2000 | Sindhushayana et al. ... 370/470 |
| 6,111,860 A | * | 8/2000 | Braun ........................ 370/276 |

FOREIGN PATENT DOCUMENTS

| DE | A1-19651593 | 6/1998 |
|---|---|---|
| EP | A2218448 | 4/1987 |

* cited by examiner

Primary Examiner—Wellington Chin
Assistant Examiner—John Shew
(74) Attorney, Agent, or Firm—Birch, Stewart, Kolasch & Birch, LLP

(57) ABSTRACT

The invention relates to an arrangement for optimizing the data transmission over a bidirectional radio channel. According to the invention, the digital data to be transmitted according to a data transmission protocol is divided into individual data packets in each of two transmitting/receiving stations. In each transmitting/receiving station, the number and/or priority and/or type (e.g. information, control characters, repeat blocks) of the data packets generated by the data transmission protocol of the higher level and transmitted to the respective transmitter of the station is determined (data packet identifications). According to the data packet identifications, the data transmission protocol is then selected in at least one of the stations in accordance with an optimum utilization of the radio channel capacity.

6 Claims, 1 Drawing Sheet

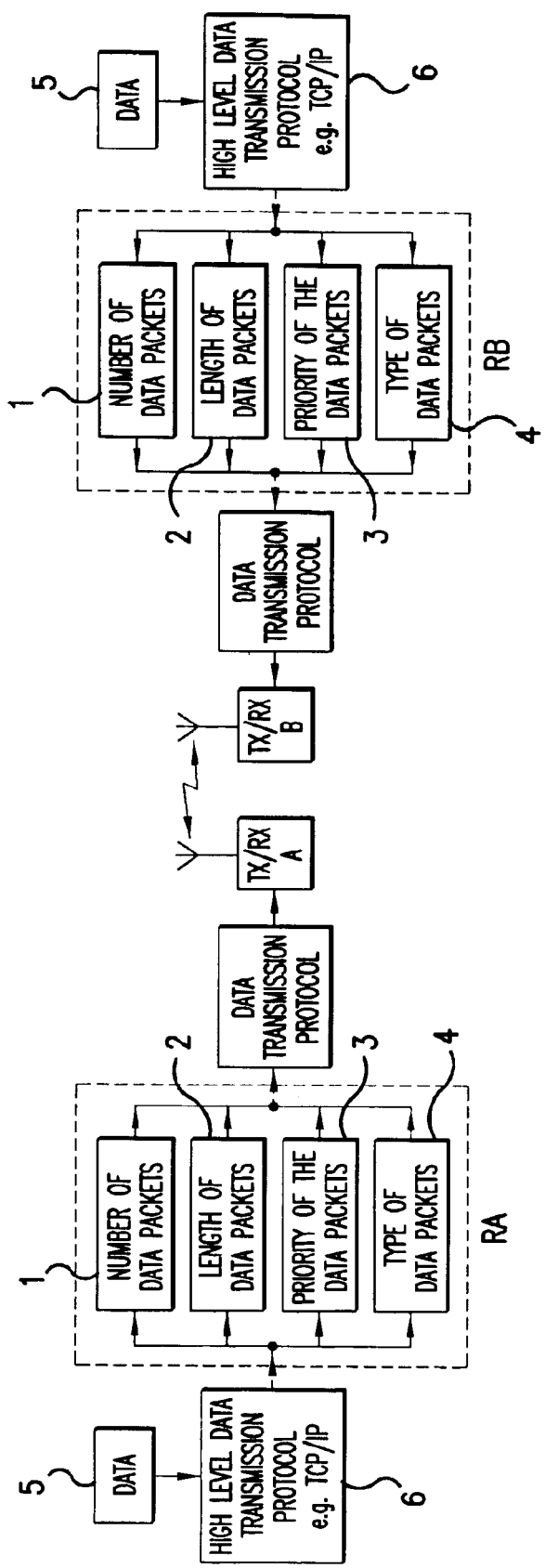

ARRANGEMENT FOR OPTIMIZING THE DATA TRANSMISSION OVER A BIDIRECTIONAL RADIO CHANNEL

This application is the national phase under 35 U.S.C. § 371 of PCT International Application No. PCT/EP99/01220 which has an International filing date of Feb. 25, 1999, which designated the United States of America.

BACKGROUND OF THE INVENTION

1. Field of the Invention

The present invention relates to and is based on a method for transmitting over a bidirectional radio channel.

2. Description of the Background Art

It is known that for transmission of digital data such as digitized speech or other digital information over a (bidirectional) shortwave radio channel in both transmission directions, the digital data to be transmitted, which is transmitted over the radio channel alternately in forward and reverse directions (simplex operation), can be processed according to a predetermined data transmission protocol, also referred to below as DÜP, and divided into individual data packets (e.g., according to A. S. Tanenbaum, *Computer Networks*, Prentice Hall, Englewood Cliffs, 1981, pages 136 ff.; European Patent No. 730,356). This digital data for transmission can also be processed first according to another data transmission protocol at a higher level, i.e., a higher-level data transmission protocol, also referred to below as D ÜPHE, e.g., according to the known TCP/IP method (transmission control protocol/Internet protocol). For optimizing data transmission over such a bidirectional radio channel, there have already been proposals to determine the bit error rate at the receiving end and transmit it back to the transmitter, where the length of the data packets is revised accordingly (older German Patent Application 196 51 593.9). Furthermore, it is also known that in a data transmission system that operates by the duplex method and has two separate transmission channels, the data rate can vary as a function of the prevailing data occurrence to make the transmission less sensitive to interference (U.S. Pat. No. 5,513,213).

Depending on the type of digital data to be transmitted and the higher-level data transmission protocol (DÜPHE) processing the data, such as TCP/IP, the resulting data packets and acknowledgments in both transmission directions may vary greatly in length and frequency, and thus data throughput can be greatly impaired even when using the above-mentioned optimization of data transmission with the data transmission protocol DÜP.

SUMMARY OF THE INVENTION

Therefore, the object of this invention is to create a method for optimizing data transmission over a bidirectional radio channel, where the available bidirectional channel capacity is optimally adapted to the data occurrence in both directions.

According to this invention, before transmitting the data packets of the data transmission protocol DÜP, data packet identifiers of the higher-level data transmission protocol D ÜPHE are determined, i.e., the number and/or length and/or priority and/or type of data packets is determined, and the length of data packets of data transmission protocol DÜP is adjusted as a function thereof. A wide variety of possible combinations are conceivable for these data packet identifiers. In the simplest case, it may be sufficient to determine only the instantaneous number of data packets or the expected number of data packets. The adjustment is better if, in addition, the instantaneous or expected length of the data packets of the data to be transmitted is also taken into account as an identifier. It is even better to determine the instantaneous or expected priority of incoming data packets from the higher-level data transmission protocol DÜPHE to data transmission protocol DÜP or the instantaneous or expected type of data (information, acknowledgment, control commands or the like). Another identifier may be the respective relevance of data packets of the higher-level data transmission protocol DÜPHE, e.g., the fact that this is a repeat packet. This quantitative determination of data packet identifiers takes place on both sides of the wireless link, and then the length of data packets produced by data transmission protocol DÜP can be adjusted on the basis of these identifiers in the sense of optimum utilization of radio channel capacity, and thus also the frequency in switching between the two directions of the radio channel can be adjusted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the FIGURE shows a schematic diagram of a transmission system according to a preferred embodiment of the invention.

DETAILED DESCRIPTION

The FIGURE shows a schematic diagram of a bidirectional shortwave connection between a transmitting and receiving station A and a transmitting and a receiving station B. Digital data to be transmitted is divided by a higher-level data transmission protocol DÜPHE such as TCP/IP into individual data packets that are sent in succession over a radio driver RA to the data transmission protocol DÜP of the actual transmitter of station A and transmitted over the radio channel to remote station B, where the data packets are analyzed in the receiver there according to its data transmission protocol DÜP. Digital data to be transmitted is processed in the same way in the transmission operation of remote station B and sent over a radio driver RB to the data transmission protocol DÜP of the transmitter of station B and transmitted over the radio channel to station A. The packets generated by the respective data transmission protocol DÜP may be composed of a variable number of frames, for example, where the number of frames per packet may be between 1 and 15, for example, depending on the quality of the wireless link. Each frame may in turn consist of a 5 byte header of control information, followed by a data part between 4 and 250 bytes long, for example, and a redundancy code (CRC) 2 bytes long, for example. Through the choice of the data volume per frame and the choice of the number of frames per packet, the packet length of the data transmission protocol DÜP can be selected as desired, e.g., between 64 bytes and 8 kbytes, in each station A and B at the transmitting end.

Of the incoming data packets in radio drivers RA and RB from the higher-level data transmission protocol DÜPHE, the number, length, priority and type (control information, data information, acknowledgments, etc.) are determined, and depending on these characteristics, the data transmission protocol DÜP with which the data packets to be transmitted are divided into individual data packets before being transmitted over the transmitter of station A is adjusted accordingly. For example, if a number of short data packets of 100 bytes, for example, to be transmitted is detected in radio driver RA, then the length of data packets generated according to the data transmission protocol DÜP is set at this length. If a plurality of long packets of several kilobytes, for example, arrive at the radio driver, the packets DÜP are lengthened as much as allowed by the data occurrence at the remote station and the instantaneous channel quality.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of transmitting data over a bidirectional radio channel, the method comprising:
   dividing digital data that is to be transmitted into a first set of individual data packets according to a first data transmission protocol;
   dividing, at a transmitting and receiving station of the bidirectional radio channel, the data according to a second data transmission protocol into a second set of individual data packets; and
   transmitting the second set of individual data packets alternately forward and in reverse between transmitting and receiving stations over the radio channel by a simplex transmission operation,
   wherein, at each transmitting and receiving station a number, a length, a priority, and/or a type of the first set of individual data packets generated by the first data transmission protocol is determined as a data packet identifier, and a length of the second set of data packets generated by the second data transmission protocol is determined in at least one of the transmitting and receiving stations as a function of these data packet identifiers for optimum utilization of radio channel capacity.

2. The method according to claim 1, wherein the data packet identifier is determined at a sending and receiving station and the data packet length is determined as a function thereof at the same station.

3. The method according to claim 1, wherein the data packet identifier determined at a transmitting and receiving station is transmitted to the remote station and is used to influence the length of the data packets in the second data transmission protocol.

4. The method according to claim 1, wherein data packet identifiers determined at both transmitting and receiving stations are transmitted to the respective remote station, where they are used to set the length of the data packets of the second data transmission protocol.

5. A transmission system comprising:
   a first transmitting/receiving station for transmitting and receiving data to and from a second transmitting/receiving station via a shortwave radio channel having a fixed data rate,
   wherein the first and second transmitting/receiving stations each:
   receive inputted data packets that are based on a first data protocol, wherein:
   data packet identifiers of the inputted data packets, which are based on the first data protocol, are determined, the data packet identifiers identifying a number, a length, a priority, or a type of the data packets; and
   second data packets are formed based on a second data protocol and on the basis of the data packet identifiers, the second data packets being transmitted over the shortwave radio channel, and
   wherein the first and second transmitting/receiving stations adjust a frequency of switching between transmitting and receiving the second data packets on the basis of the data packet identifiers of the inputted data packets.

6. The transmission system according to claim 5, wherein the first data protocol is a TCP/IP protocol.

* * * * *